United States Patent [19]

Rooker et al.

[11] Patent Number: 4,755,194
[45] Date of Patent: Jul. 5, 1988

[54] METHOD FOR INTRODUCING A MIXTURE OF GAS AND LIQUID INTO A SEPARATOR VESSEL

[75] Inventors: Mitchel L. Rooker, Sand Springs; Merle B. Inman, Tulsa, both of Okla.

[73] Assignee: National Tank Company, Tulsa, Okla.

[21] Appl. No.: 67,832

[22] Filed: Jun. 29, 1987

Related U.S. Application Data

[62] Division of Ser. No. 710,749, Mar. 11, 1985, abandoned.

[51] Int. Cl.⁴ .............................................. B01D 19/00
[52] U.S. Cl. .......................................... 55/52; 55/188; 55/201
[58] Field of Search ............................ 55/185–188, 55/201, 204, 1, 17, 36, 52

[56] References Cited

U.S. PATENT DOCUMENTS

| | | | |
|---|---|---|---|
| 2,547,769 | 4/1951 | Packie et al. | 55/337 |
| 2,595,602 | 5/1952 | Parks | 55/186 X |
| 2,788,080 | 4/1957 | Guarin | 55/186 X |
| 3,273,318 | 9/1966 | Meyer | 55/185 X |
| 3,306,007 | 2/1967 | Glasgow | 55/185 X |
| 3,921,250 | 11/1975 | Jerabek | 55/418 X |
| 3,997,303 | 12/1976 | Newton | 55/185 X |
| 4,343,630 | 8/1982 | Grant | 55/201 X |
| 4,352,683 | 10/1982 | Vogel | 55/201 X |
| 4,375,977 | 3/1983 | Honerkamp et al. | 55/234 X |
| 4,432,779 | 2/1984 | Honerkamp et al. | 55/233 |

OTHER PUBLICATIONS

Perry et al., "Chemical Engineers' Handbook", 4th ed., 1963, pp. 18-84 and 18-85.

*Primary Examiner*—Charles Hart
*Attorney, Agent, or Firm*—William W. Habelt

[57] ABSTRACT

A vertical separator vessel has an inlet structure mounted at the inlet to receive a mixture of fluids to be separated. The inlet structure is given several configurations which divide the incoming mixture of fluids into at least two segments and thereby reduces the velocity of the mixture.

1 Claim, 2 Drawing Sheets

METHOD FOR INTRODUCING A MIXTURE OF GAS AND LIQUID INTO A SEPARATOR VESSEL

This is a division, of application Ser. No. 710,749, filed Mar. 11, 1985 and now abandoned.

TECHNICAL FIELD

The present invention relates to separators containing internal structures mounted in the separator to receive a mixture of fluids to be separated. More particularly, the invention relates to impact structure mounted within the separator to initiate separation, velocity reduction, and distribution of the fluids.

BACKGROUND ART

The classic inlet diverter structure for a vertical gas/liquid separator is a spinner. The inlet nozzle can be attached to the vessel at an angle tangential to the circle of the separator shell, or if the nozzle is attached along a radius of the circle, a diverter structure inside the vessel diverts the entire stream 45 to 90° to one side of the separator. Either structure creates a single tangential flow that produces a spiral flow of inlet fluids.

The typical oilfield, vertical, gas well separator receives the inlet flow near a point intermediate the top and bottom of the vessel. Gas exits the top and oil exits the bottom. The objective is that the outlet gas contain no liquid and the outlet liquid contain no gas. To attain these purities, several separation phenomena must occur and several carryover phenomena must be prevented:

(1) A primary separation of bulk liquids from the gas stream must occur before the gas enters the mist extractor. Mist extractors cannot handle heavy liquid loads. If loaded too heavily, liquid won't drain down through the mist extractor, it will be dragged up and carried out by the gas - "re-entrainment".

(2) A mist extractor (typically wire mesh) is required to capture the small particles of liquid in the gas flow. This mist is called entrainment.

(3) In order to attain the highest rate possible through wire mesh without causing re-entrainment, the gas flow profile into the mesh pad must be as uniform as possible. If there are any local areas where the velocity is greater than the average, superficial value, then premature re-entrainment will occur at that point. In the prior art, a single spiral of the input fluids creates a ring of flow that leaves the central portion of the mesh pad unused.

(4) The liquid gravitates to the bottom of the separator. However, if the gas spiral velocity is too high, gravity won't be able to hold the liquid down. Violent waves can form on the liquid surface. The gas tears liquid from the tips of waves, or the suction at the center of the spiral picks up liquid directly, - "re-entrainment".

(5) The liquid phase contains bubbles of liquid that must rise to the surface and rupture. The liquid spins in response to the gas spiral and this reduces the degassing of the liquid. Bubbles rise slowly in moving liquid. Also, if the liquid is slightly foamy, the turbulence at the surface inhibits drainage of foam and even creates foam. Foam is easily picked up by the gas and thrown into the mist extractor. Foam decays slowly in the mist extractor and is easily blown through it.

It quickly becomes clear that separators are not "low technology" structures; they are complex. Separators are sized by using the deceptively simple K-factor formula:

$$V = K\sqrt{\frac{P_1 - P_g}{P_g}}$$

This formula defines the maximum gas velocity that can be allowed without causing re-entrainment. The K-factor is a ratio of kinetic gas force to gravitational force on the liquid. Gravity attempts to keep oceans, cars, and houses attached to the earth, but in a hurricane, the K-factor of the winds is high enough to overcome gravity and pick up objects. The classic K-factor value for vertical separators is 0.35, but this can vary considerably, depending on design. Superior designs allow higher K-factors and produce greater outlet stream purities. Higher K-factors mean smaller vessels and lower cost.

The inlet device affects all 5 separation phenomena and the K-factor which can be used. It has the awesome task of reducing pipeline K-factors of 10 to 20 to a vessel K-factor of 0.35. That is a reduction of velocity by 60 times. That is an absorption of 99.97% of the inlet energy.

There has been a popular misconception floating around within the oil industry that the velocity of the single undivided inlet spiral should be high for efficient separation of gas and liquids. This is only partially true. A higher velocity increases the centrifugal separation ability of the inlet spiral. But for the typical oilfield case, the mist is created due to high pipeline velocities. Using a nozzle that is smaller than the pipeline has a net effect of increasing the amount of mist entering the mist extractor. Additionally, the inlet spiral is not an efficient mist extractor. It catches particles above 100 microns while the wire mesh catches particles above 5 microns. Increasing the spiral velocity is not only unnecessary, it is harmful. It increases re-entrainment due to the other four phenomena mentioned above. An inlet structure should reduce velocity, not increase it. Two exceptions are the genre of centrifugal separators designed to catch very fine mist produced from rapid condensation, or for cyclone polishing separation. But this misapplied concept has floated through the past century inspiring numerous ill-fated failures.

A means is needed to reduce the velocity of the incoming well stream to improve the separation of gas and liquids by giving a more efficient primary separation of bulk liquids, a more uniform flow profile into the mist extractor, less liquid pickup from the liquid surface, and faster degassing and foam decay.

DISCLOSURE OF THE INVENTION

The present invention contemplates structure within a vertical gas/liquid separator which will divide the incoming well stream into at least two segments which are spiraled in opposite directions by tangential impact on the vessel wall to subsequently collide and reduce velocity. This velocity reduction results in reducing the energy, real K-factor, and turbulence in the gas flow. The end result of reduced velocity is improved separation of gas and liquids by giving a more efficient primary separation of bulk liquids, a more uniform flow profile into the mist extractor, less liquid pickup from the lower liquid surface, and faster degassing and foam decay.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Figures 1, 2, 3:
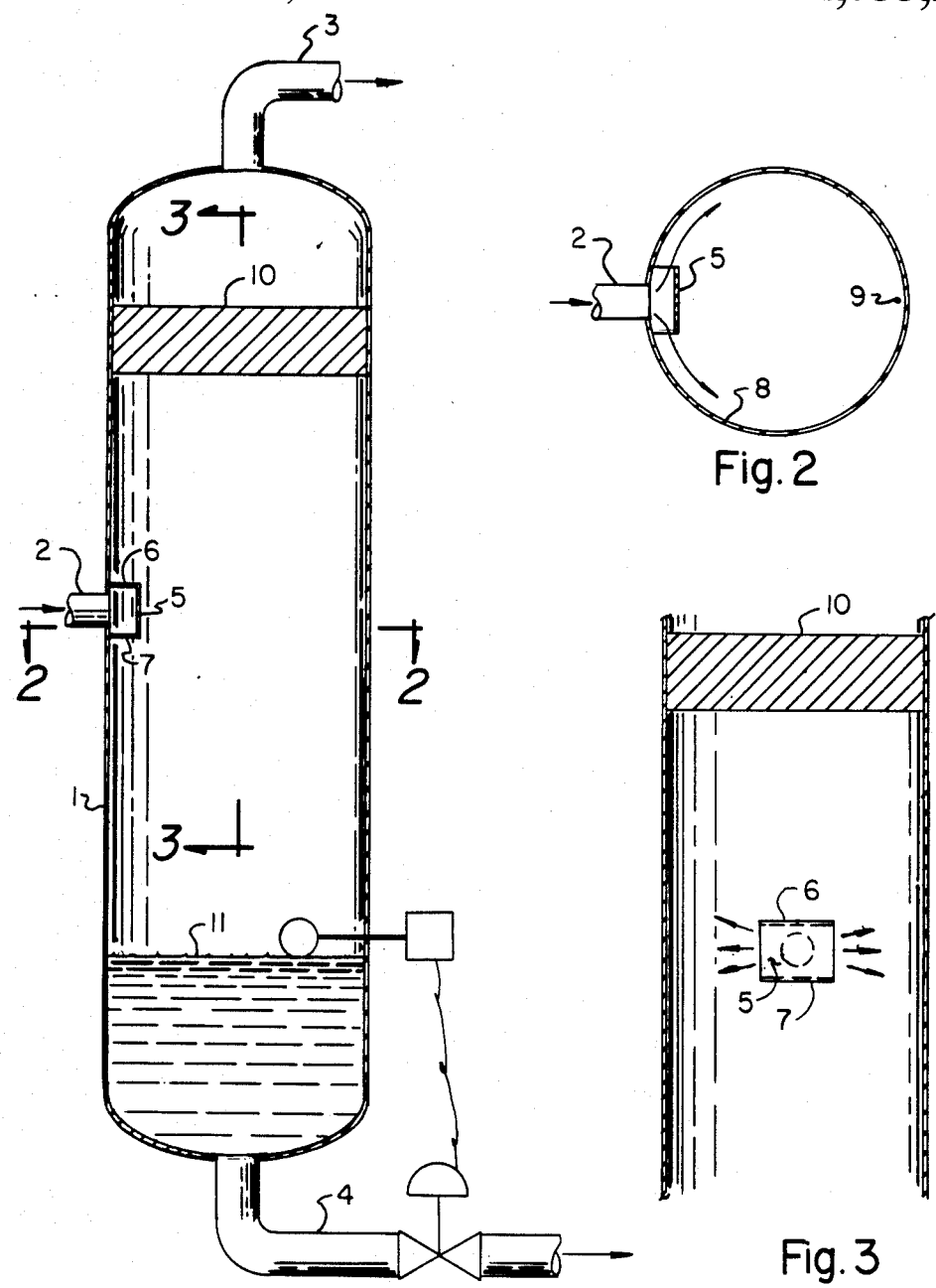
FIG. 1 is a sectioned elevation of a vertical gas/liquid separator whose diverter structure at the inlet embodies the present invention.
FIG. 2 is a sectioned plan view of the separator of FIG. 1 disclosing the inlet diverter.
FIG. 3 is a sectioned elevation of the separator of FIG. 1 along lines 3—3.

All the drawings have in common various forms for the structure at the inlet to a vertical separator which divide the incoming stream into two segments which are diverted to impinge upon the internal wall of the separator until they meet and collide. This basic arrangement of dividing, diverting the incoming stream to the wall of the separator, and collision, dissipate most of the velocity while absorbing the energy of the stream. With substantially 30% of the energy of the stream dissipated by the diverter structure at the inlet, 30% by impingement on the vessel wall, and 30% by collision of the two segments, one result is a substantially clean gas, with a low order of liquid entrainment, ascending to a mist extractor and thence to the gas outlet of the separator. The liquid, efficiently separated from the gas, gravitates to the bottom of the separator and to the outlet for the liquid. As disclosed in the drawings, there are various shapes of inlet structure for the gas stream to contact and be diverted in opposite directions to the wall of the separator and eventual collision.

In order to describe the function of the structure embodying the invention, the fluids received by the structure can be described broadly as fluids of different densities. The fluid of lesser density is identified as gas. The fluid of greater density is referred to as liquid. Regardless of what they are called, the structure embodying the invention receives the fluids as a mixture which is separated. The lighter or gaseous fluid ascends in the vertical separator while the separated liquid gravitates to the lower end or bottom of the separator.

Taking FIGS. 1, 2 and 3 together, a vertical separator 1 is represented by a cylindrical vessel closed at the top and bottom. The stream of liquid and gas enters vessel 1 through a conduit 2. After separation, the gas exits from the top of the vessel through a conduit 3, and the liquid gravitates to the bottom of the vessel and exits through conduit 4. The incoming stream through conduit 2 is directed against a back plate 5. Flanges 6 and 7 are connected to the back plate to form a channel. The flanges are welded to the vessel wall. The channel, comprised of back plate 5 and flanges 6 and 7, is oriented to divide the incoming stream into two segments and divert the segments in opposite directions to impinge on surface 8 of the vessel wall. The two segments of the stream are guided by surface 8 to a collision point 9 on the vessel wall. The collision of the two segments substantially absorbs the remaining energy of the segments. The gas is thereby disengaged from the liquid and travels upward with even distribution across the face of a wire mesh mist extractor 10. Flowing through the mist extractor, the gas is substantially denuded of entrained liquid and leaves vessel 1 through gas outlet conduit 3. After collision at point 9, the liquid gravitates downward and joins a collected liquid body 11 with relatively little energy remaining. The liquid is drawn from the bottom of separator 1 through conduit 4.

Figure 4:
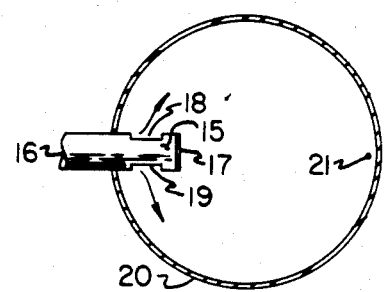
FIGS. 4–8 are sectioned plan views disclosing other forms of the inlet diverter for the separator of FIG. 1.

An alternate inlet structure is disclosed in FIG. 4 and may be referred to as a slotted pipe. A cylindrical pipe 15 forms an extension of inlet 16, and the pipe end is closed at 17. Slots 18 and 19 are formed through the sides of the pipe. With this structure mounted through wall 20, the incoming stream will impact upon end 17, which is the equivalent of back plate 5 in FIGS. 1, 2 and 3. Slots 18 and 19 each become an exit for substantially half of the total stream. The stream is divided into two segments and each segment is impinged upon the wall of the separator and directed to a collision point 21 to complete the reduction of velocity and energy of the incoming stream. Separation takes place as in the preceding three figures.

Figure 5:
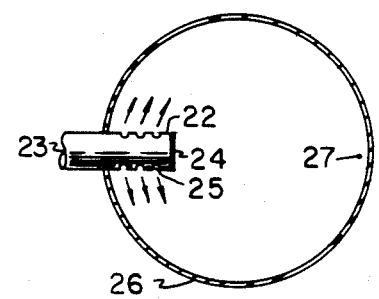

In FIG. 5, a cylindrical pipe 22 is an extension of inlet conduit 23. Pipe end 24 is closed to form an impact surface. Alternate to the slots of FIG. 4, holes 25 are arranged in two groups through which the fluid mixture exits pipe 22 to direct the two segments of the divided stream in opposite directions toward impingement on the wall of vessel 26. The result, is flow of the two segments along the vessel wall and into collision at point 27, which will dissipate the velocity and energy of the stream for subsequent efficient separation.

Figure 6:
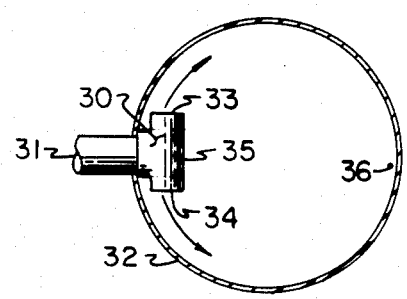

In FIG. 6, the inlet structure has the general form of a "T", with the stalk 30 of the "T" being, in effect, an extension of inlet conduit 31 which penetrates wall 32 of the separator vessel. Outlet conduits 33 and 34 complete the "T". Back portion 35 of the "T" forms the impact surface of the invention. The incoming stream impacts on this surface and is divided into two segments which are diverted to outlets 33 and 34. Conforming to the concept of the invention, "T" outlets 33 and 34 direct their respective segments of the stream to the inner surface of vessel wall 32. Continued flow of the segments around the vessel wall result in collision of the two segments at point 36. Separation of the fluid mixture of the stream continues as with the preceding inlet structures.

Figure 7:
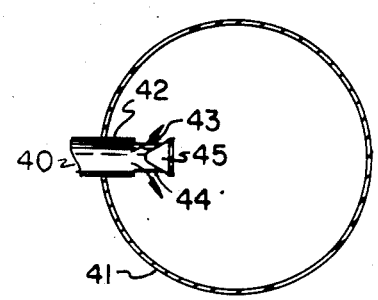

FIG. 7 discloses an inlet structure comparable to FIG. 4. Inlet conduit 40 brings the incoming stream through vessel wall 41. Conduit 42 is an extension of inlet conduit 40 and is slotted at 43 and 44. The end of this slotted conduit is altered in contrast to pipe end 17 of FIG. 4. This impact portion of the conduit is provided a cone or wedge shape 45 which more smoothly alters the direction of the two segments of the stream toward outlet slots 43 and 44. Rather than diverting the two segments of the stream by a flat plate, the cone or wedge surface 45 modifies the transition of the incoming stream from the flow toward the cone surface into a direct diversion through the slots and onto the wall of the vessel. The streamline impact at the point of highest shear force reduces the creation of mist in some applications.

Figure 8:
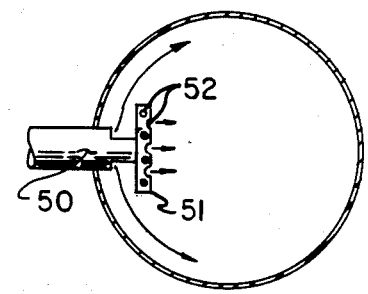

FIG. 8 discloses two variations on the same theme. A combination slotted pipe 50 and channel 51 produces a full 90° turn. This improves velocity reduction. The channel is a guide and holes 52 in the impact surface and/or guiding flanges allow a fraction of the stream to travel straight ahead and/or vertically which increases utilization of the space within the vessel. Increased fragmentation and volume improve velocity reduction and distribution.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A method of separating a high energy stream from a well formed of a mixture of gas and liquid in a separator vessel comprising a substantially vertically extending, cylindrical wall having inlet means formed through the wall in the central portion of the vessel, the inlet means connected to a source of a gas and liquid mixture to receive and introduce into the vessel the gas and liquid to be separated, mist extractor means mounted across the upper end of the vessel above the inlet means for receiving the ascending gas to substantially remove remaining liquid from the gas, an outlet through the vessel above the mist extractor means to discharge the substantially liquid-free gas, and an outlet through the lower portion of the vessel to withdraw the liquid separated from the gas and collected in the lower portion of the vessel, said method of separation comprising:

providing an impact surface within the separator vessel opposite the inlet means and directing the incoming gas and liquid stream to impact against the impact surface whereby substantially 30 percent of the energy of the incoming stream is dissipated, dividing the incoming gas and liquid stream received by the inlet means and directed against the impact means into at least two substantially equal segments, directing said two segments of gas and liquid stream away from the inlet means substantially horizontally in opposite directions to each other, impinging each segment of gas and liquid stream directed away from the inlet means against the wall of the vessel whereby an additional substantially 30 percent of the energy of the incoming stream is dissipated, guiding each segment of gas and liquid having impinged against the wall of the vessel circumferentially along the wall to a point diametrically opposite the inlet means, and colliding the oppositely directed segments of gas and liquid mixture into each other at said point whereby an additional substantially 30 percent of the energy of the incoming stream is dissipated and the gas and liquid separation will occur and the gas will be evenly distributed over the cross section of the vessel.

* * * * *